United States Patent [19]

Pomerantz

[11] 4,122,336
[45] Oct. 24, 1978

[54] PROGRAMMABLE LIGHT ACTIVATED TIMING DEVICE

[75] Inventor: Daniel I. Pomerantz, Lexington, Mass.

[73] Assignee: P. R. Mallory & Co. Inc., Indianapolis, Ind.

[21] Appl. No.: 789,811

[22] Filed: Apr. 22, 1977

[51] Int. Cl.² .............................................. G01D 5/34
[52] U.S. Cl. ................................ 250/229; 250/237 R
[58] Field of Search ............ 318/480; 250/229, 231 R, 250/231 SE, 237 R; 74/3.5, 3.52

[56] References Cited

U.S. PATENT DOCUMENTS

| | | | |
|---|---|---|---|
| 3,307,041 | 2/1967 | Kling | 250/229 |
| 3,525,094 | 8/1970 | Leonard | 250/231 SE |
| 4,053,784 | 10/1977 | Kuze | 250/237 R |

*Primary Examiner*—David C. Nelms
*Attorney, Agent, or Firm*—Hoffmann, Meyer & Coles

[57] ABSTRACT

A programmable timing device includes a plurality of rotatable discs, three of which are concentrically rotatable about a common axis, one of which is eccentrically rotatable about another axis, and three light sources. Opaque portions of the four discs periodically mask and expose the three light sources whereby detectors activate and deactivate the timing device and activate a machine function in a programmed sequence of two time intervals at two dissimilar power levels. The two power levels are determined by independently moving two of the light sources in horizontal directions whereby one of the four rotating discs periodically exposes each light source for variably controllable time periods during each of the programmed time intervals. The exposure of the horizontally movable light sources is further controlled by the rotation of another one of the four rotating discs by determining which of the light sources is exposed to the detector for actuating the machine function during each time interval.

33 Claims, 5 Drawing Figures

PROGRAMMABLE LIGHT ACTIVATED TIMING DEVICE

BACKGROUND OF THE INVENTION

Generally speaking, the present invention relates to programmable timing devices for appliances and the like and more specifically to such a device which is light activated and includes a plurality of at least partially opaque elements, a means for rotating at least three of the elements in substantially dissimilar cycles, at least two light sources wherein each of the light sources is masked by at least a portion of at least one of the elements and a means responsive to each of the light sources for activating a machine function of the appliance in a programmed sequence of at least two time intervals at at least one power level.

Programmable timing devices are generally of two types; either electronic or mechanical. Such timing devices of the mechanical variety usually include a timer motor which is utilized to drive various cams and/or to operate various electrical contacts. With the utilization of cams, the timer motor is required to drive a substantial load therefore requiring a motor which is capable of handling such loads. Depending upon the load to be driven, the cost of such motors increases or the reliability decreases as the load increases. Furthermore, the life of mechanical timing devices wherein electrical contacts are used is seriously limited, especially when such devices are placed in appliances where a large number of operations are required over the life of the timer. Because of the various mechanisms found in most mechanical timers, it is a well-known fact that many such timers either are not precise or lose their precision over their life. While many of the problems associated with mechanical timing devices have been overcome by electronic timers utilizing all solid state components, such systems many times become complex and are considerably more expensive than the conventional mechanical timer.

Timing devices which may be programmed to time a sequence of functions of an appliance at various time intervals are generally known in the art. However, many appliances now require that a single function of the appliance be timed during at least two time intervals at more than one power level. Although this invention is not intended to be limited hereto, the microwave oven is a typical example of such appliance. When cooking frozen food, it is many times desirable to defrost the food at a low power level for one programmed interval of time and to subsequently cook the food at a substantially higher power level for another programmed interval of time. During each programmed time interval, the magnetron power supply of the microwave oven must be actuated at either a low or high power level depending upon the programmed interval being timed. Utilization of conventional mechanical or electronic programmable timing devices to perform these types of functions in an appliance would result in the problems previously enumerated. Accordingly, there exists a need for a simple, inexpensive, reliable, and precise timing mechanism which would abate the aforementioned problems and be capable of being programmed for at least two time intervals at more than one power level.

SUMMARY OF THE INVENTION

It is therefore a feature of the present invention to provide a programmable timing device for timing a sequence of at least two time intervals at one or more power levels which is simple, inexpensive, reliable, and precise. Another feature of the present invention is to provide a programmable timing device which is light activated. Yet another feature of the present invention is to provide a programmable timing device for timing a sequence of at least two time intervals at two power levels. Still yet another feature of the present invention is to provide a programmable timing device which includes a plurality of at least partially opaque elements, a means for rotating at least three of the elements in substantially dissimilar cycles, at least two light sources wherein each of the light sources is masked by at least a portion of at least one of the elements, and a means responsive to each of the light sources for activating a machine function in a programmed sequence of at least two time intervals at at least one power level. Still another feature of the present invention is to provide a method of timing a machine function in a programmed sequence of at least two time intervals at at least one power level which includes the steps of rotating a plurality of elements in at least three substantially dissimilar cycles, masking at least two light sources by at least a portion of at least one of the elements, at least partially exposing at least one of the light sources during each time interval of a sequence of at least two time intervals, and detecting each exposed light source thereby activating a machine function at at least one power level.

These and other features of the invention will become more apparent from the following description taken in conjunction with the accompanying drawings which follow:

DESCRIPTION OF THE PREFERRED EMBODIMENT

Figure 1:
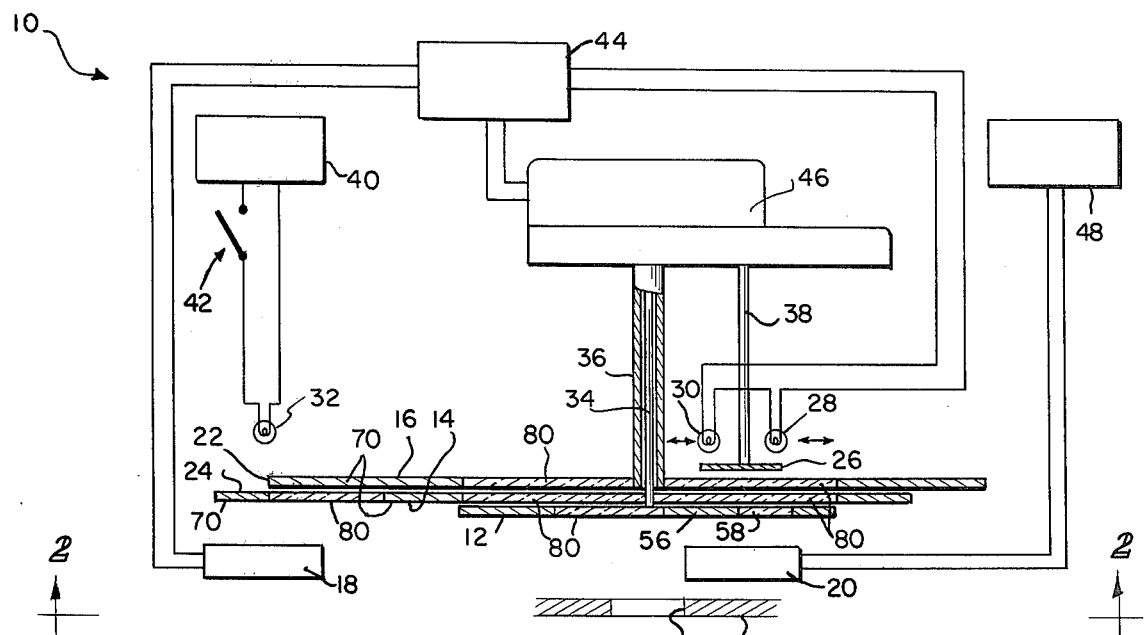
FIG. 1 is a schematic shown as a top view of a programmable timing device.

Referring to FIG. 1, a programmable light activated timing device 10 includes a series of four at least partially opaque discs 12, 14, 16, and 26 each of which is in spaced parallel relationship to all of the other discs of the series; a means 46 for rotating discs 12, 14, 16, and 26 which further includes three rotatable shafts 34, 36, and 38 coupled thereto; three light sources 28, 30, and 32; a means 20 for actuating a machine function 48 which is responsive to either light source 28 or light source 30; a means 18 for activating light sources 28 and 30 and rotating means 46 which is responsive to light source 32; two shutters 22 and 24 situated on the peripheries of discs 16 and 14 respectively which when concurrently positioned in front of light source 32 obscures light source 32 from activating means 18; a means 44 for driving light sources 28 and 30 and rotating means 46; a power supply source 40; and a means 42 for switching light source 32 on and off.

Rotating means 46 may be any conventional synchronous timer motor; however, for purposes of this invention, the motor should be inexpensive and have a simple operation. In the application of this invention to an appliance such as a microwave oven the "mode stirring" motor which is prevalent in almost all microwave ovens could be utilized to at least rotate disc 26 since the rotation cycle of the "mode stirring" motor is substantially similar to the required cycle of disc 26 in this invention. Shafts 34, 36, and 38 protrude from the gear box (not shown) of rotating means 46 and are geared such that shaft 34 is rotated in a counterclockwise direction by rotating means 46 having a cycle of substantially one-half revolution per hour, shaft 36 is rotated in a counterclockwise direction having a cycle of substantially 1 revolution per minute, and shaft 38 is rotated in either a clockwise or counterclockwise direction (depending upon how the shaft 38 is geared) having a cycle of substantially 30 revolutions per minute. Shaft 36 is concentric with shaft 34; however, as previously noted, shafts 34 and 36 have dissimilar cycles. Discs 12 and 14 are concentrically coupled to shaft 34 and in turn to rotating means 46. Disc 16 is coupled to shaft 36 and in turn to rotating means 46 and is concentric with discs 12 and 14. Disc 26 is eccentrically coupled to shaft 38 and in turn to rotating means 46. Accordingly discs 12, 14, 16, and 26 rotate in the same direction and in cycles substantially the same as the respective shafts to which they are coupled.

Driving means 44 is electrically coupled to light sources 28 and 30 and also to rotating means 46 and may be any conventional power supply source which when activated by activating means 18 will in turn activate light sources 28 and 30 and rotating means 46. Power supply source 40 again may be any conventional power supply source and switching means 42 may be any conventional "on-off" or "start-stop" switch.

Activating means 18 and actuating means 20 each include a conventional photo detector; however, again in keeping with the intent of the present invention such photo detectors should be inexpensive and simple. Activating means 18 is responsive to light source 32 and electrically coupled to driving means 44 such that when at least one of the shutters 22 or 24 is in a position other than directly in front of light source 32, activating means 18 will detect the exposed light being emitted from light source 32 and transmit an electrical signal to driving means 44 thereby activating light sources 28 and 30 and rotating means 46. Light source 32 is a sufficiently broad source so that neither shutter 22 nor 24 alone will totally obscure it from activating means 18. Furthermore, light source 32 is electrically coupled to power supply source 40 and may be turned on or off by any conventional switching means 42.

Light sources 28 and 30 are independently movable in horizontal directions as indicated by the arrows in FIG. 1 and each is electrically coupled to driving means 44. Light sources 28 and 30 may be moved by means of any conventional mechanical device such as a lever (not shown) which may protrude through the front panel of an appliance so as to be accessible to the user of the appliance. Since disc 26 is eccentrially coupled to shaft 38 it serves as a shutter which periodically completely obscures at least one of the light sources 28 or 30 from actuating means 20. Actuating means 20 is responsive to either of the light sources 28 or 30 and is electrically coupled to machine function 48 such that when either of the light sources 28 or 30 is at least periodically exposed to actuating means 20 as a result of the rotation of disc 26, actuating means 20 will actuate machine function 48 at at least one power level. The power level is determined by the percentage of time the light source, either 28 or 30, is exposed to actuating means 20. Two different power levels may be preselected by positioning light sources 28 and 30 in different horizontal positions with respect to the rotation of disc 26. The percentage of time that each light source 28 or 30 is exposed to actuating means 20 and therefore the power level associated with each light source 28 or 30 will be determined by the respective horizontal position of each light source with respect to the rotation of disc 26. For example, viewing light sources 28 and 30 from the front of programmable light activated timing device 10, if light source 30 is positioned horizontally all the way to the left, actuating means 20 will be exposed to light source 30 for a total rotation of disc 26 thus resulting in a 100% duty cycle of machine function 48. However, if light source 30 is positioned horizontally all the way to the right, it will be obscured from actuating means 20 most of the time during a single rotation of disc 26 thus resulting in a much smaller exposure time of actuating means 20 to light source 30 and therefore a lower duty cycle of machine function 48.

As explained, disc 26 and the horizontal positioning of each light source 28 and 30 determines the percentage of time during which either light source 28 or 30 may be exposed to actuating means 20; however, whether actuating means 20 is exposed to light source 28 or 30 during a given time interval will be determined by the position of disc 12 as explained hereinafter.

Figure 2:
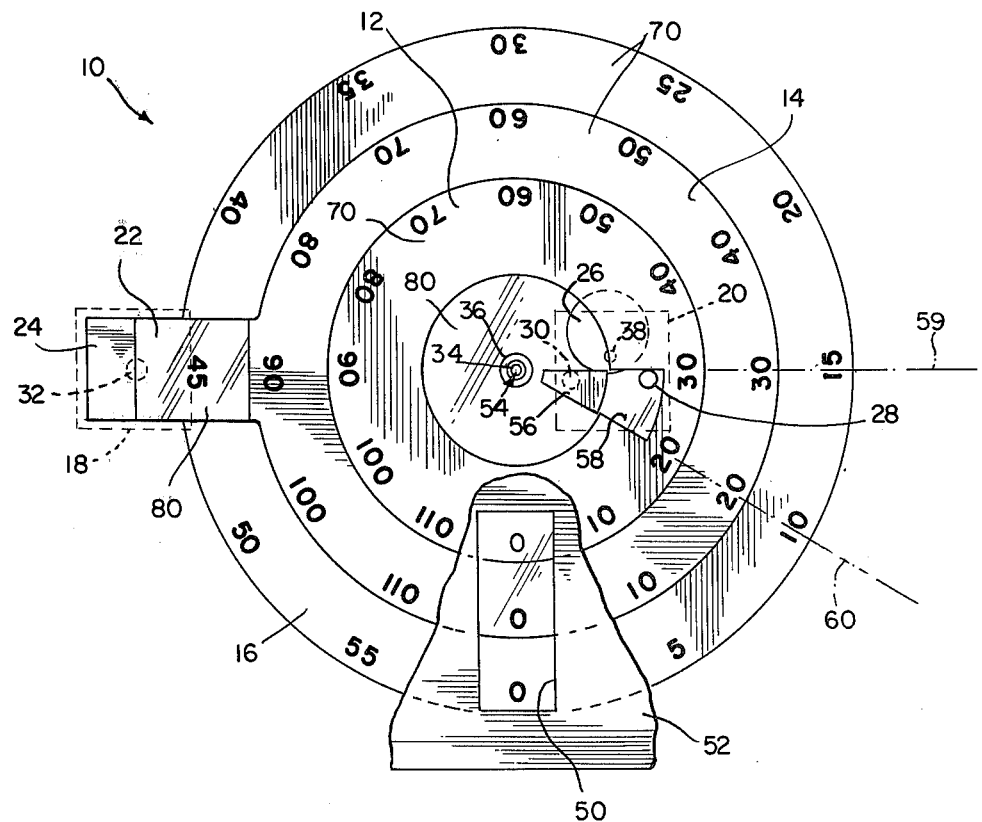
FIG. 2 is a first sectional view of a programmable timing device taken along lines 2—2 of FIG. 1 shown in an unprogrammed state.

Referring now to FIG. 2, disc 12 has a diameter which is smaller than the diameter of either disc 14 or 16 and larger than the diameter of disc 26. As shown in FIG. 2, disc 12 includes areas 70 which are opaque to light and areas 80 which are transparent to light. Additionally, disc 12 is graduated into increments representing minutes which include transparent numerals 0, 10, 20, etc. up through and including 110 situated around its edge. These numerals may be further subdivided into smaller increments as desired. A transparent opening 50 in the front panel 52 of the appliance provides a means whereby the user of the appliance may view such numerals during operation. An area 80 includes a transparent window 58 situated in a portion of an opaque area 70 of disc 12 which subtends an angle 57 formed by two radii 59 and 60 extending from common center 54 as shown in FIG. 2 such that when disc 12 is in a position whereby its numeral 0 appears in opening 50 light source 28 may be exposed throgh transparent window 58 to actuating means 20. An opaque area 70 includes a triangular segment 56 situated in a transparent area 80 of disc 12 which is adjacent to transparent window 58 and subtends the same angle 57 subtended by transparent window 58 such that when disc 12 is in a position whereby its numeral 0 appears in opening 50 light source 30 is totally obscured by triangular segment 56 from actuating means 20. When disc 12 is programmed, light source 28 is obscured by an opaque area 70 of disc 12 and coincidentally light source 30 is exposed through a transparent area 80 of disc 12. Accordingly, light being emitted from light source 30 may be detected by actuating means 20.

Disc 14 has a diameter which is smaller than disc 16 and larger than discs 12 and 26. As shown in FIG. 2, disc 14 is almost completely opaque 70 with the exception of that circular area 80 of disc 14 which has a radius at least equal to the outer radius of transparent window 58 of disc 12. Disc 14 is also graduated into increments representing minutes which include transparent numerals 0, 10, 20, etc. up throgh ahd including 110 which may be further subdivided into smaller increments situated around its edge. Coupled to the periphery of disc 14 is an opaque shutter 24 such that when disc 14 is in a position whereby its numeral 0 appears in opening 50 shutter 24 partially obscures light source 32.

Disc 16 has a diameter which is larger than discs 12, 14, and 26. As shown in FIG. 2, disc 16 is almost completely opaque 70, again with the exception of that circular area 80 of disc 16 which has a radius at least equal to the outer radius of transparent window 58 of disc 12. Disc 16 is graduated into increments representing seconds which include transparent numerals 0, 5, 10, 15, etc. up through and including 55 which may be further subdivided into smaller increments situated around its edge. Coupled to the periphery of disc 16 is an opaque shutter 22 situated at a dissimilar distance from common center 54 than shutter 24 such that when disc 16 is in a position whereby its numeral 0 appears in opening 50 shutter 22 partially obscures light source 32. When discs 14 and 16 are both in a position whereby their respective numerals 0 appear in opening 50, shutters 24 and 22 cooperate to totally obscure light source 32 from activating means 18.

Althogh not shown, it is intended that in the operation of programmable light activated timing device 10 certain mechanisms well known in the art must be utilized. Discs 12, 14, and 16 must be capable of being hand turned in a clockwise direction to preset selected time intervals and thereby program timing device 10. This may be accomplished by means of knobs (not shown) coupled to the discs and protruding through the front panel 52 of the appliance. Clutch or ratchet mechanisms (not shown) well known in the art may be utilized in coupling the discs to their respective shafts to allow for the clockwise rotation. Furthermore, discs 12 and 14 must be coupled so that disc 14 may be turned in a clockwise direction without turning disc 12 but when disc 12 is turned in a clockwise direction, disc 14 turns with disc 12 in the same direction and through the same angle. Again this may be accomplished by utilizing clutch or ratchet mechanisms well known in the art. Disc 16 should not be coupled to either disc 12 or 14 in the above described manner. Discs 12 and 14 should also be equipped with a means for preventing them from rotating in a counterclockwise direction beyond the position wherein their respective numerals 0 appear in opening 50 and from being hand rotated in a clockwise direction beyond a 360° rotation. Although not necessarily required for this invention, disc 16 may further be made to index both discs 12 and 14 by one displayed minute for each revolution of disc 16 so that discs 12 and 14 will be caused to change by 1 minute for each revolution of disc 16.

The operation of programmable light activated timing device 10 can best be visualized by the example which is provided hereinbelow:

EXAMPLE

Figure 3:
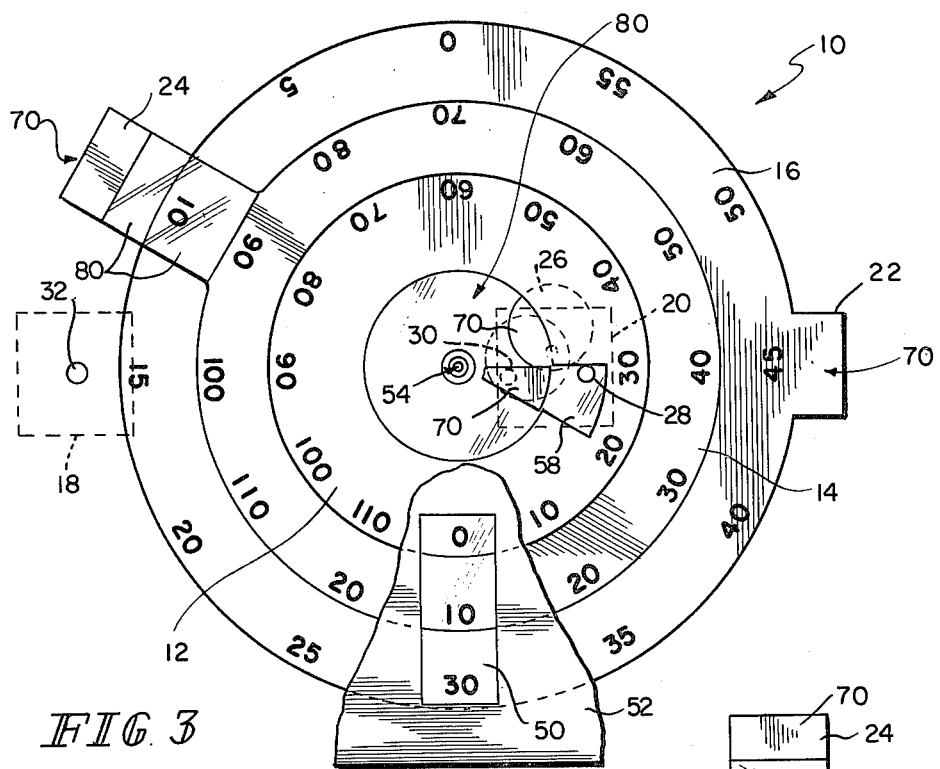
FIG. 3 is a second sectional view of a programmable timing device taken along lines 2—2 of FIG. 1 shown in a first transition state.
Figure 4:
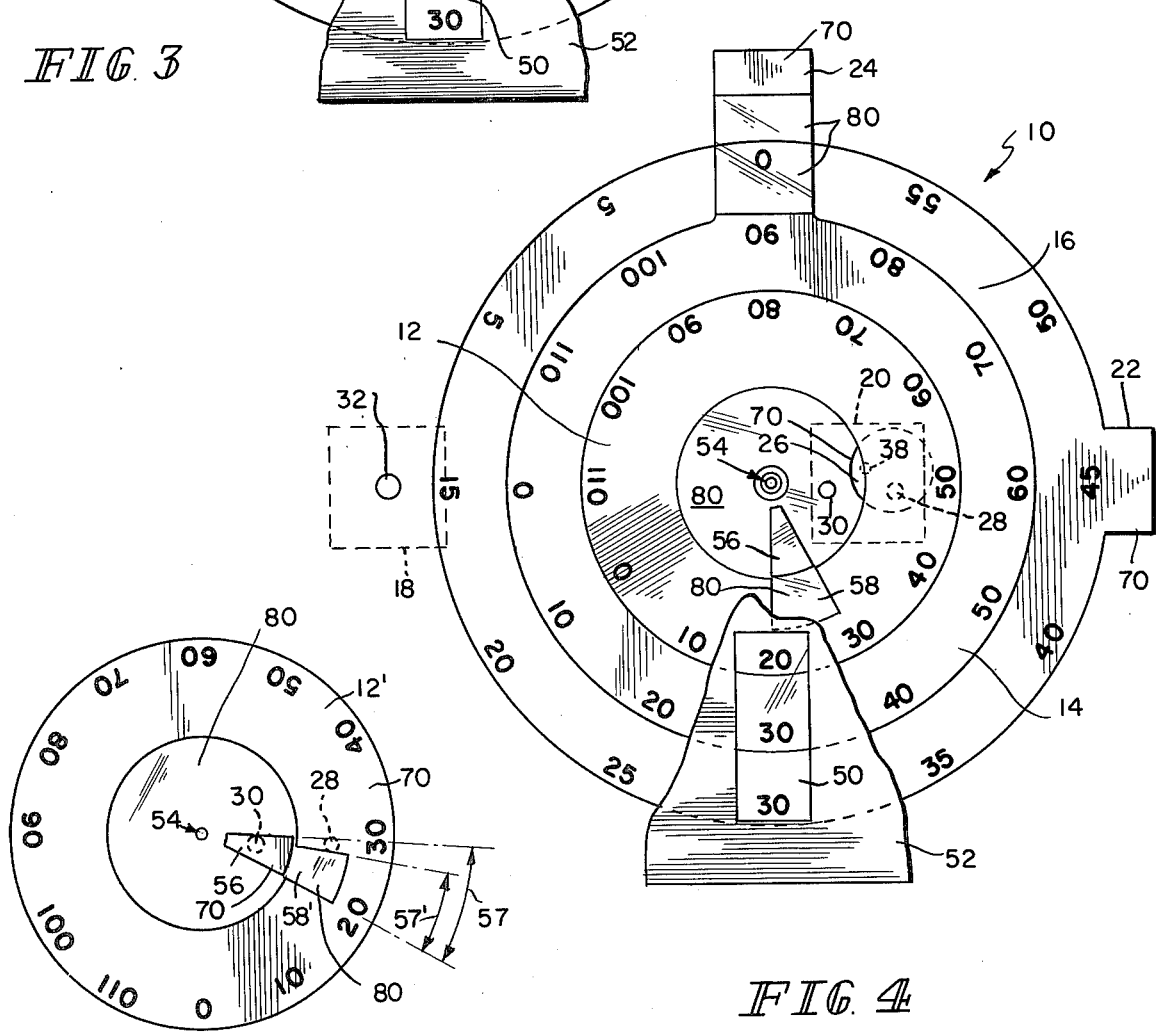
FIG. 4 is a third sectional view of a programmable timing device taken along lines 2—2 of FIG. 1 shown in a second transition state.

Referring to FIGS. 2, 3, and 4; in FIG. 2 programmable light activated timing device 10 is shown as it would normally appear prior to programming with zero time indicated by discs 12, 14, and 16. For purposes of illustration, it is assumed that it is desired to program an appliance, such as a microwave oven, to perform a cooking function for two different time intervals and at two different power levels. For example, to defrost an item of frozen food at 50% power level for a time interval of 20 minutes followed by cooking the food at 100% power level for 10 minutes and 30 seconds.

Referring to FIG. 3 the second (cooking) time interval is programmed by manually rotating disc 14 in a clockwise direction in the manner previously described until the numeral 10 appears in the opening 50 which may be indicated as the "cook time (minutes)" by a label placed on front panel 52 and by manually rotating disc 16 in a clockwise direction, again in the manner previously described, until the numeral 30 appears in the opening 50 which may be indicated as the "cook time (seconds)" by a label placed on front panel 52. The manual rotations of discs 14 and 16 correspondingly cause a displacement or rotation of shutters 24 and 22 respectively such that light source 32 is exposed to activating means 18 and therefore upon turning-on light source 32 activating means 18 will detect the light emitted by light source 32 thereby activating programmable light activated timing deice 10.

Referring to FIG. 4 the first (defrost) time interval is programmed by manually rotating disc 12 in a clockwise direction until the numeral 20 appears in the opening 50 which may be indicated as the "pre-cook time (minutes)" by a label placed on front panel 52. Since disc 14 turns with disc 12 through the same angle when disc 12 is rotated in a clockwise direction, disc 14 will be advanced to a position whereby the numeral 30 now appears in the "cook time (minutes)" opening 50. Therefore, because of the mechanical connection of discs 12 and 14 as previously described, the 20 minutes of defrost (pre-cook) time have been added to the 10 minutes 30 seconds of cook time to produce a total time for the two time intervals of 30 minutes and 30 seconds. With the manual rotation of disc 12 in a clockwise direction light source 28 becomes totally obscured from actuating means 20 and light source 30 is exposed to actuating means 20. Accordingly, it can be seen that light source 30 in conjunction with the rotation of disc 26 will control the power level at which a machine function (magnetron power supply in a microwave oven) operates during the first preselected (pre-cook) time interval and that light source 28 in conjunction with the rotation of disc 26 will control the power level at which the machine function operates during the second preselected (cook) time interval.

The appropriate power levels for the defrost operation and the cook operation of the microwave oven i.e., 50% power level and 100% power level respectively are preselected or programmed by positioning light sources 30 and 28 respectively in their proper horizontal positions. This may be accomplished by means of a mechanical device such as a lever which is movable from the front panel 52 of the microwave oven with index marks representing the power levels associated with various horizontal positions of light sources 30 and 28.

Having programmed the timing device 10, it may be initiated by a switching means such as the switching means 42 shown in FIG. 1 which turns on light source 32. Since the shutters 24 and 22 on the peripheries of discs 14 and 16 respectively have been rotated clockwise, light source 32 is exposed and detected by activating means 18. Activating means 18 in turn activates rotating means 46 and light sources 28 and 30 thereby activating timing device 10.

With the activation of rotating means 46, discs 12 and 14 commence rotating in a counterclockwise direction at a cycle of one-half revolution per hour. Disc 16 commences rotating in a counterclockwise direction at 1 revolution per minute and disc 26 commences rotating in the direction for which it is geared at approximately 30 revolutions per minute. Because of the preselected position of disc 12, when timing device 10 is activated, light source 30 is exposed to actuating means 20 and light source 28 is totally obscured by an opaque area 70 of disc 12. This condition will continue to exist until the time interval programmed by disc 12 terminates (in this example in 20 minutes) and disc 12 is therefore returned to a position where its numeral 0 appears in the opening 50 at which time light source 30 will become totally obscured by opaque triangular segment 56 and light source 28 which is positioned for the desired power level required during the second (cook) time interval will be exposed to actuating means 20 through transparent window 58 (as shown in FIG. 3). During both time intervals the percentage of time during which light sources 28 and 30 are exposed to actuating means 20 is determined by their preselected horizontal positions with respect to the rotation of disc 26. The second (cook) time interval will then continue until discs 14 and 16 are both rotated such that their respective zero numerals appear simultaneously in the opening 50 in front panel 52. When this condition occurs, the discs 12, 14, and 16 will have returned to their positions as they existed prior to the programming of timing device 10 as shown in FIG. 2. Shutters 22 and 24 are returned so that they concurrently obscure light source 32 from activating means 18 thereby removing the power from light sources 28 and 30 and from rotating means 46. The result is that the machine function 48 (FIG. 1) is permanently shut off, all discs are returned to their initial positions, rotating means 46 is turned off and the timing device is ready to be programmed for a new sequence of time intervals.

Figure 5:
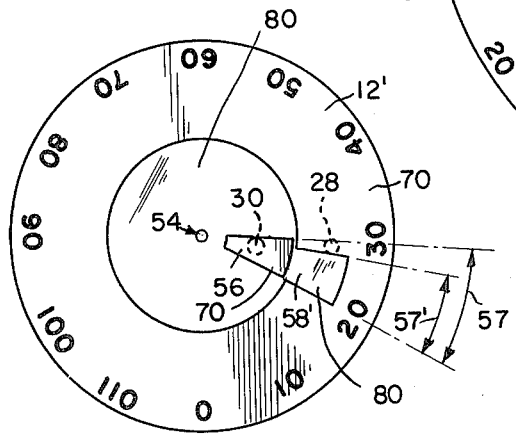
FIG. 5 is a sectional view of a portion of a programmable timing device showing a second embodiment thereof.

Referring now to FIG. 5, it may be desirous to have a time period between the first (defrosting) and second (cooking) time intervals during which the machine funtion 48 (the magnetron power supply) has no power being supplied to it. This may be accomplished by the utilization of a disc 12' as shown in FIG. 5 in place of disc 12 as shown in FIGS. 2, 3, and 4 wherein during the desired time period both light sources 28 and 30 are completely obscured from actuating means 18 by opaque areas 70 of disc 12'. As shown in FIG. 5, disc 12' is substantially similar to disc 12; however, transparent window 58 which is situated in an opaque area 70 of disc 12' subtends a substantially smaller and therefore different angle 57' than the angle 57 (shown in FIG. 2) subtended by opaque triangular segment 56. The smaller the angle 57' the longer the time period during which no power will be supplied to machine function 48.

What is claimed is:

1. A programmable timing device for an appliance and the like comprising a plurality of elements each having substantially opaque and transparent portions for precluding and permitting the passage of light respectively, a means for rotating at least three of said elements in substantially dissimilar cycles, at least two light sources wherein each of said light sources is masked by an opaque portion of at least one of said elements and each of said light sources is at least periodically exposed by another element through a transparent portion of said one element in a programmed sequence of at least two time intervals, and a means responsive to each exposed light source for actuating a machine function of said appliance in said programmed sequence of time intervals at at least one power level.

2. The timing device as recited in claim 1 wherein said plurality of elements includes a series of discs.

3. The timing device as recited in claim 2 wherein each disc of said series of discs has a dissimilar diameter and is in parallel relation to at least one other disc of said series of discs.

4. The timing device as recited in claim 3 wherein at least three discs of said series of discs are concentrically coupled to said rotating means.

5. The timing device as recited in claim 4 wherein at least one disc of said series of discs is eccentrically coupled to said rotating means.

6. The timing device as recited in claim 5 wherein at least two discs of said series of discs are rotated in substantially similar cycles.

7. The timing device as recited in claim 6 wherein a first and second disc of said series of discs are graduated into increments representing minutes and a third disc of said series of discs is graduated into increments representing seconds whereby rotation of said first disc provides a first time interval for said machine function and rotation of at least said second disc provides a second time interval for said machine function.

8. The timing device as recited in claim 7 wherein a fourth disc of said series of discs is an opaque shutter which periodically obscures said light sources.

9. The timing device as recited in claim 8 wherein said light sources are independently movable in at least one horizontal direction.

10. The timing device as recited in claim 9 wherein a first power level may be preselected by moving one of said light sources and a second power level may be preselected by moving another of said light sources to their respective proper horizontal positions.

11. The timing device as recited in claim 10 wherein a transparent window situated in at least a portion of said first disc which is opaque and an adjacent opaque triangular segment situated in at least a portion of said first disc which is transparent subtend at least one angle formed by two radii of said disc.

12. The timing device as recited in claim 11 wherein said transparent window and said adjacent opaque triangular segment coincidentally subtend said angle.

13. The timing device as recited in claim 11 wherein said transparent window and said adjacent opaque triangular segment subtend two dissimilar angles.

14. The timing device as recited in claim 11 wherein the percentage of time during a time interval that each of said light sources is exposed to said actuating means is determined by said horizontal placement of said light sources and said rotation of said fourth disc.

15. The timing device as recited in claim 14 wherein said first disc determines which of said light sources is exposed during each of said time intervals.

16. The timing device as recited in claim 15 wherein said rotating means includes at least three rotatable shafts protruding therefrom wherein at most only two discs of said series of discs are coupled to any one of said shafts.

17. The timing device as recited in claim 16 wherein a first shaft of said rotating means rotates in a counterclockwise direction having a cycle of one-half revolution per hour, a second shaft of said rotating means rotates in a counterclockwise direction having a cycle of 1 revolution per minute, and a third shaft of said rotating means may rotate in any direction having a cycle of 30 revolutions per minute.

18. The timing device as recited in claim 17 wherein said first and second discs are coupled to said first shaft thereby having cycles of one-half revolution per hour, said third disc is coupled to said second shaft thereby having a cycle of 1 revolution per minute, and said fourth disc is coupled to said third shaft thereby having a cycle of 30 revolutions per minute.

19. The timing device as recited in claim 4 further comprising a means for activating said rotating means and said light sources.

20. The timing device as recited in claim 19 wherein said activating means is responsive to a third light source.

21. The timing device as recited in claim 20 wherein said third light source is masked by at least one opaque shutter situated adjacent to at least one of said concentric discs of said series of discs.

22. The timing device as recited in claim 21 wherein said activating means is obscured from said third light source by said opaque shutter and another opaque shutter situated adjacent to at leat another of said concentric discs of said series of discs when both of said shutters are concurrently positioned therebetween.

23. The timing device as recited in claim 22 wherein said opaque shutters are situated at substantially dissimilar radial distances from a common center of said concentric discs.

24. A method fo timing a machine function in a programmed sequence of at least two time intervals at dissimilar power levels during each time interval comprising the steps of rotating a plurality of elements in at least three substantially dissimilar cycles, masking at least one of two light sources by a substantially opaque portion of at least one of said elements during each time interval of said sequence of time intervals, at least periodically exposing at least one of said light sources through a substantially transparent portion of said element for dissimilar time periods during each time interval of said sequence of time intervals, and detecting said exposed light source thereby actuating a machine function at dissimilar power levels during each time interval.

25. The method of timing a machine function as recited in claim 24 wherein at least three elements of said plurality of elements are concentrically rotated about a common axis.

26. The method of timing a machine function as recited in claim 25 wherein at least two elements of said plurality of elements are rotated in substantially similar cycles.

27. The method of timing a machine function as recited in claim 26 wherein at least one element of said plurality of elements is eccentrically rotated about another axis and at least periodically exposes said one light source during each time interval.

28. The method of timing a machine function as recited in claim 27 further comprising the step of independently and horizontally moving said light sources whereby dissimilar time periods are determined for each time interval for exposure of said one light source.

29. The method of timing a machine function as recited in claim 28 further comprising the step of determining which one of said two light sources is exposed during each of said time intervals by rotation of at least one of said concentrically rotated discs.

30. The method of timing a machine function as recited in claim 29 further comprising the steps of obscuring a thrid light source by at least portions of at least two of said concentric discs, at least partially exposing said third light source during each time interval of said sequence of time intervals, and detecting said exposure of said third light source during said cycles of said discs thereby activating said first and second light sources.

31. The method of timing a machine function as recited in claim 24 wherein said third light source is obscured when said portions of said two concentrically rotated discs are concurrently positioned in front thereof.

32. A programmable timing device for an appliance and the like comprising a plurality of elements each having substantially opaque and transparent portions for precluding and permitting the passage of light respectively, means for rotating at least three of said elements in substantially dissimilar cycles, at least three of said elements concentrically coupled to said rotating means and rotatable about a common axis, at least one of said elements eccentrically coupled to said rotating means and rotatable about another axis, at least two light sources wherein one of said light sources is masked by an opaque portion of at least one of said elements and one of said light sources is periodically exposed through a transparent portion of said element during rotation of said elements, and means responsive to exposure of said one light source during each time interval of a programmed sequence of at least two time intervals for actuating a machine function of said appliance at at least one power level.

33. A method of timing a machine function in a programmed sequence of at least two time intervals at dissimilar power levels during each time interval comprising the steps of rotating a plurality of elements in at least three substantially dissimilar cycles, independently moving at least two light sources in horizontal directions whereby at least one of said elements at least periodically exposes said light sources for variably controllable periods of time, masking one of said light sources by a portion of at least another of said elements during each of said time intervals, exposing one of said light sources through another portion of said other element during each of said time intervals, and detecting said at least periodically exposed one light source through said other portion of said other element thereby actuating said machine function at a dissimilar power level during each time interval.

* * * * *